US011978290B1

(12) United States Patent
Dieckhaus et al.

(10) Patent No.: US 11,978,290 B1
(45) Date of Patent: May 7, 2024

(54) SYSTEM AND METHOD FOR PRESENTATION OF VEHICLE ADAS CALIBRATION TARGETS

(71) Applicant: Hunter Engineering Company, Bridgeton, MO (US)

(72) Inventors: James T. Dieckhaus, Wildwood, MO (US); Mark E. Stirnemann, Arnold, MO (US)

(73) Assignee: HUNTER ENGINEERING COMPANY, St. Louis, MO (US)

( * ) Notice: Subject to any disclaimer, the term of this patent is extended or adjusted under 35 U.S.C. 154(b) by 437 days.

(21) Appl. No.: 17/473,185

(22) Filed: Sep. 13, 2021

Related U.S. Application Data

(60) Provisional application No. 63/140,625, filed on Jan. 22, 2021, provisional application No. 63/079,305, filed on Sep. 16, 2020.

(51) Int. Cl.
*G07C 5/08* (2006.01)
*B60W 50/06* (2006.01)
*G09F 15/00* (2006.01)

(52) U.S. Cl.
CPC ........... *G07C 5/0825* (2013.01); *B60W 50/06* (2013.01); *G09F 15/0012* (2013.01); *G09F 15/0018* (2013.01); *B60W 2420/408* (2024.01); *B60W 2555/20* (2020.02)

(58) Field of Classification Search
CPC .............. G07C 5/0825; G09F 15/0012; G09F 15/0018; B60W 50/06; B60W 2420/408; B60W 2555/20
See application file for complete search history.

(56) References Cited

U.S. PATENT DOCUMENTS

| 7,121,011 | B2 | 10/2006 | Murray et al. |
| 10,634,488 | B2 | 4/2020 | Stieff et al. |
| 11,079,060 | B2 | 8/2021 | Innes |
| 2018/0188022 | A1 | 7/2018 | Leikert |
| 2019/0376640 | A1 | 12/2019 | Innes |
| 2020/0273206 | A1 | 8/2020 | Corghi |
| 2021/0318117 | A1* | 10/2021 | Strege ................. G06K 7/1443 |

FOREIGN PATENT DOCUMENTS

EP 3699549 A1 8/2020

* cited by examiner

*Primary Examiner* — Peter B Kim
(74) *Attorney, Agent, or Firm* — Sandberg Phoenix & von Gontard P.C.

(57) ABSTRACT

A system for temporarily mounting an observable target on a vehicle service system during a vehicle service or inspection process. The system includes at least one target backing plate affixed at a known or determinable position on the vehicle service system facing a vehicle undergoing service or inspection. The target backing plate provides a forward facing planar surface receiving a removable optical target, with at least one target guide element to provide a fixed reference for indexed alignment of the removable optical target on the target backing plate.

19 Claims, 14 Drawing Sheets

SYSTEM AND METHOD FOR PRESENTATION OF VEHICLE ADAS CALIBRATION TARGETS

CROSS-REFERENCE TO RELATED APPLICATIONS

The present application is related to, and claims priority to, U.S. Provisional Patent Application Ser. No. 63/140,625 field on Jan. 22, 2021, and to U.S. Provisional Patent Application Ser. No. 63/079,305 filed on Sep. 16, 2020, both of which are herein incorporated by reference.

STATEMENT REGARDING FEDERALLY SPONSORED RESEARCH

Not Applicable.

BACKGROUND OF THE INVENTION

The present application is related to systems and methods for facilitating calibration and inspection of vehicle onboard advanced driver assistance systems (ADAS), and in particular, to systems and methods for presenting vehicle-specific ADAS calibration and inspection targets within a field of view of a vehicle ADAS device.

Vehicle onboard advanced driver assistance systems typically include one or more sensors configured to observe the environment in proximity to the vehicle. These sensors may be designed to detect visible light, infrared light, or energy in the non-visible portion of the spectrum, such as radar reflections. In order to perform calibration or inspection of such a sensor, vehicle manufacturers typically specify the placement of an observable target having features visible to the sensors within the sensor's field of view. While some vehicle manufacturers may utilize common targets across several vehicle makes or models within a product line, different vehicle manufacturers typically utilize observable targets unique to their vehicle offerings. The use of vehicle-specific observable targets results in vehicle service and repair shops needing to acquire, store and select from, a wide range of observable targets in order to service a range of vehicles.

Accordingly, there is a need among automotive service providers for an efficient and cost effective process for storing and utilizing a wide range of observable targets to facilitate servicing the ADAS components on a wide range of vehicles.

BRIEF SUMMARY OF THE INVENTION

Briefly stated, the present disclosure facilitates the use of observable ADAS calibration targets by providing a system for temporarily mounting individual ADAS calibration targets on a vehicle service system during a vehicle service or inspection process. The system includes at least one target backing plate temporarily affixed at a known or determinable position on the vehicle service system facing a vehicle undergoing service or inspection. The target backing plate provides a forward facing planar surface presenting sufficient area to removably support the ADAS calibration target, and at least one target guide element to provide a fixed reference for indexed alignment of the ADAS calibration target on the target backing plate.

In one embodiment, the ADAS calibration targets are printed onto a flexible layer of material, with the target backing plate providing a planar surface to temporarily support the ADAS calibration targets during use. Each ADAS calibration target includes at least one rigid edge configured to engage and index to a corresponding target guide element adjacent an upper edge of the target backing plate during placement, positioning the ADAS calibration target in a predetermined position and/or orientation on the target backing plate. The ADAS calibration target is rolled upward from a lower edge towards an upper edge for compact storage when not in use. Optionally, the lower edge of the ADAS calibration target is weighted to allow gravity to assist in maintaining the flexible layer of material in sufficient contact with the planar surface of the target backing plate to maintain a measure of flatness required for vehicle ADAS calibration procedures. Additional means for temporarily holding the ADAS calibration target against the planar surface may be provided, such as magnetic media, hook and loop fasteners, or electrostatic adhesion.

In a further embodiment, each ADAS calibration target is encoded with a target identifier capable of being optically decoded by the vehicle service system when the ADAS calibration target is removably mounted to the target backing plate. The target identifier is encoded into the ADAS calibration target by providing optically reflective, transparent, or obscuring regions on a surface of the target in alignment with an associated optical sensor secured to the target backing plate. An appropriate decoding system for reading the encoded target identifier is incorporated into the vehicle service system. The decoding system is in operative communication with a processor of the vehicle service system, which in turn is configured with appropriate software instructions to verify the proper ADAS calibration target is in use during a vehicle service procedure.

In an alternative configuration, the vehicle service system for use during a vehicle service or inspection process includes a target mounting system configured to simultaneously support two or more removable ADAS calibration targets. The target mounting system consists of a horizontal rail supported for vertical movement along a column or upright frame. Two or more mounting carriages are disposed for independent lateral movement along the horizontal support rail. An absolute and/or relative position of each mounting carriage on the horizontal rail is known or determinable by a processor associated with the vehicle service system. The processor is responsive to an output of a rotational position encoder on each mounting carriage engaged with a linear gear extending along the horizontal rail. Each mounting carriage includes a set of attachment points for receiving a coupling member affixed to a rear surface of either a removable rigid ADAS calibration target, such as a radar reflective target, or a removable ADAS calibration target support panel, thereby facilitating the interchange of ADAS calibration targets as required to service a variety of vehicle makes and models. Removable ADAS calibration targets or target support panels secured to each of the mounting carriages may be positioned in a laterally spaced arrangement on the horizontal support rail, or may be positioned in abutting engagement to appear to a vehicle undergoing service as a single ADAS calibration target of increased size.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Figure 1:
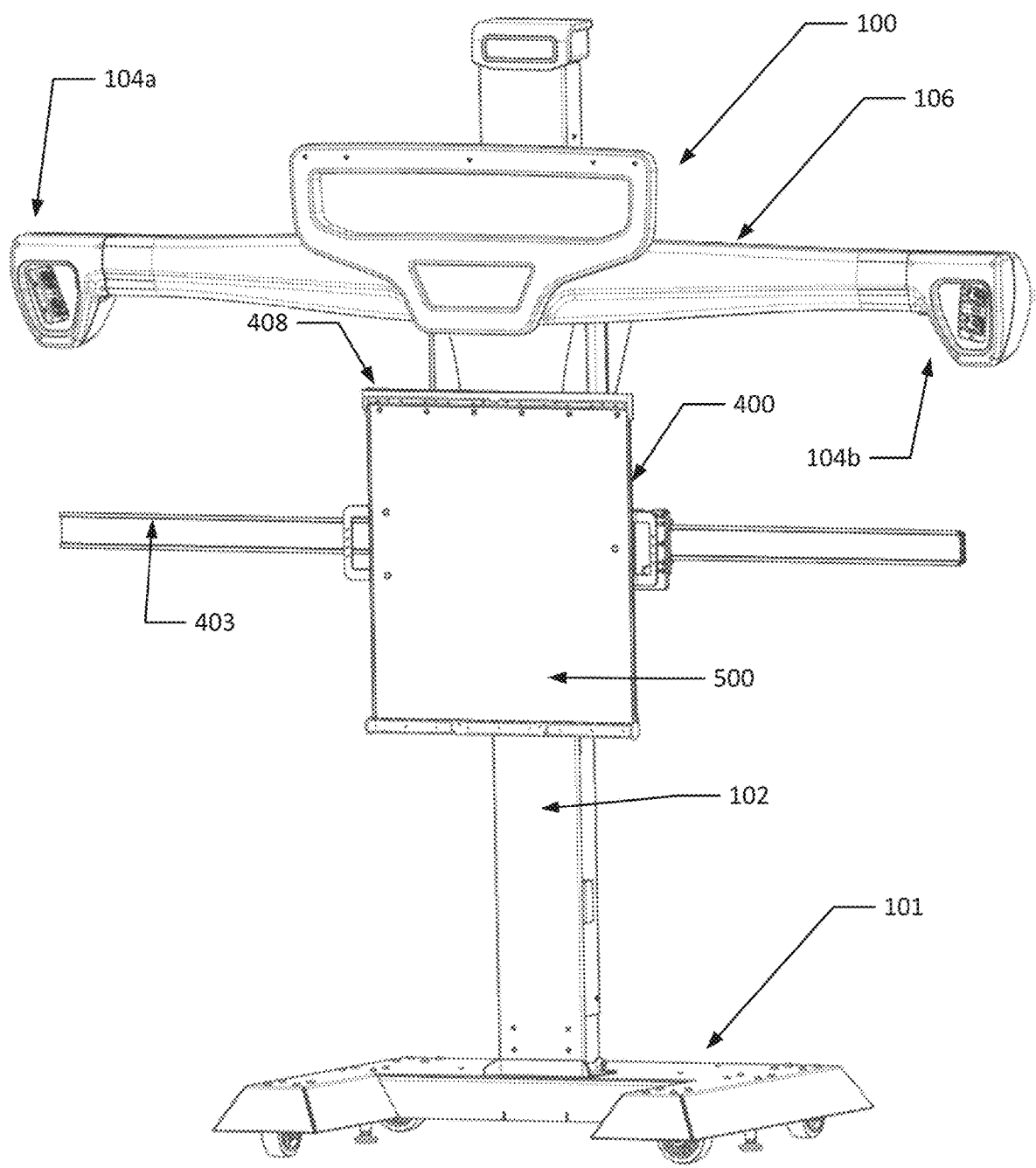
FIG. 1 is a perspective view of a vehicle service system supporting a removable ADAS calibration target of the present disclosure.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

The present disclosure facilitates the use of interchangeable ADAS calibration targets by providing a system for temporarily mounting an ADAS calibration target on a vehicle service system during a vehicle service or inspection process. The vehicle service system may be a dedicated target support structure, or may be configured to perform additional functions, such as measuring vehicle wheel alignment and guiding the placement of service fixtures relative to a vehicle undergoing service or inspection. An exemplary vehicle service system is shown in U.S. Pat. No. 10,638,488 to Stieff et al., which is herein incorporated by reference.

Figure 2:
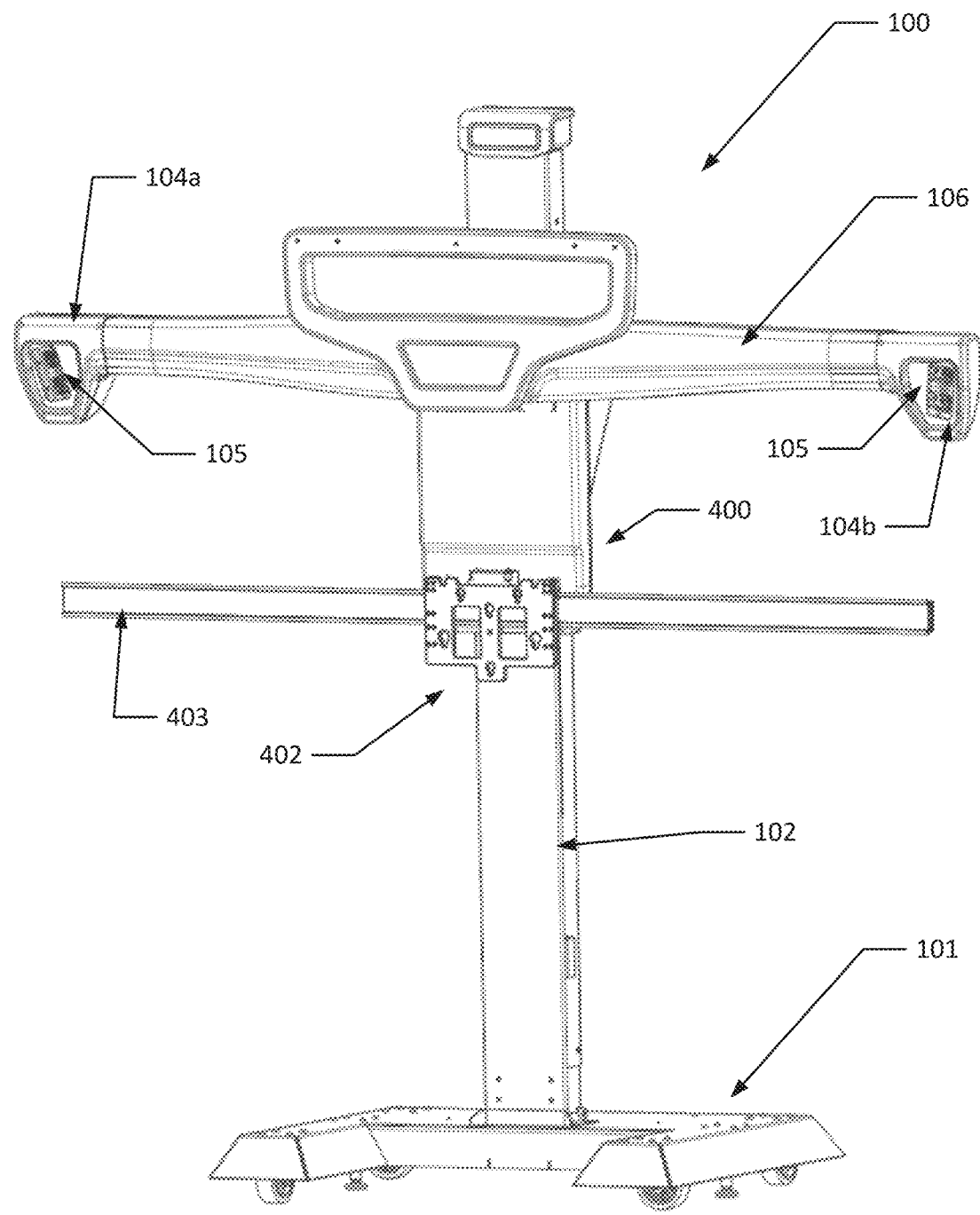
FIG. 2 is a perspective view of the vehicle service system of FIG. 1, with the ADAS calibration target and target backing frame or plate removed to reveal a target support structure.
Figure 3:
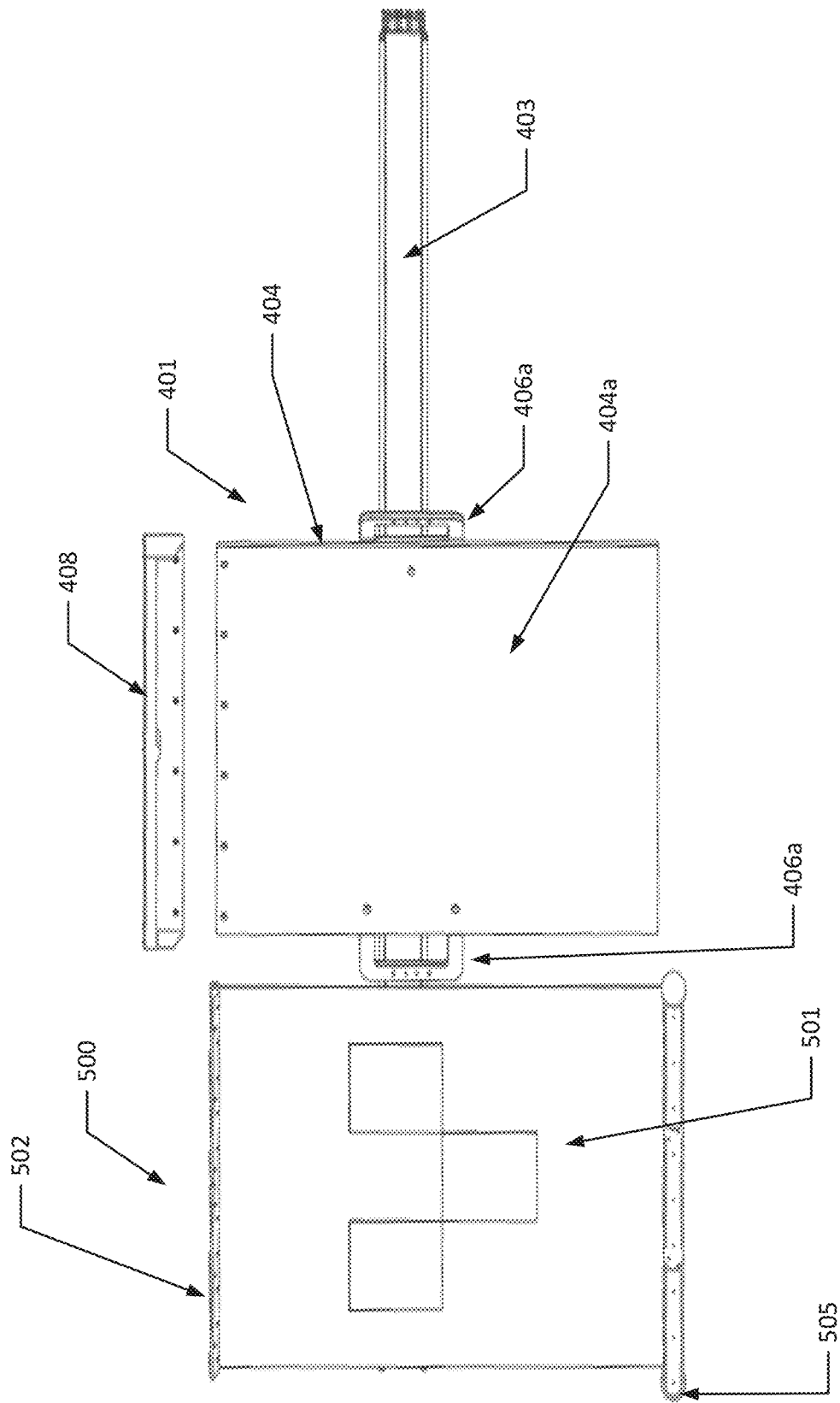
FIG. 3 is an exploded view of an ADAS calibration target and target backing frame or plate of the present disclosure.
Figure 4:
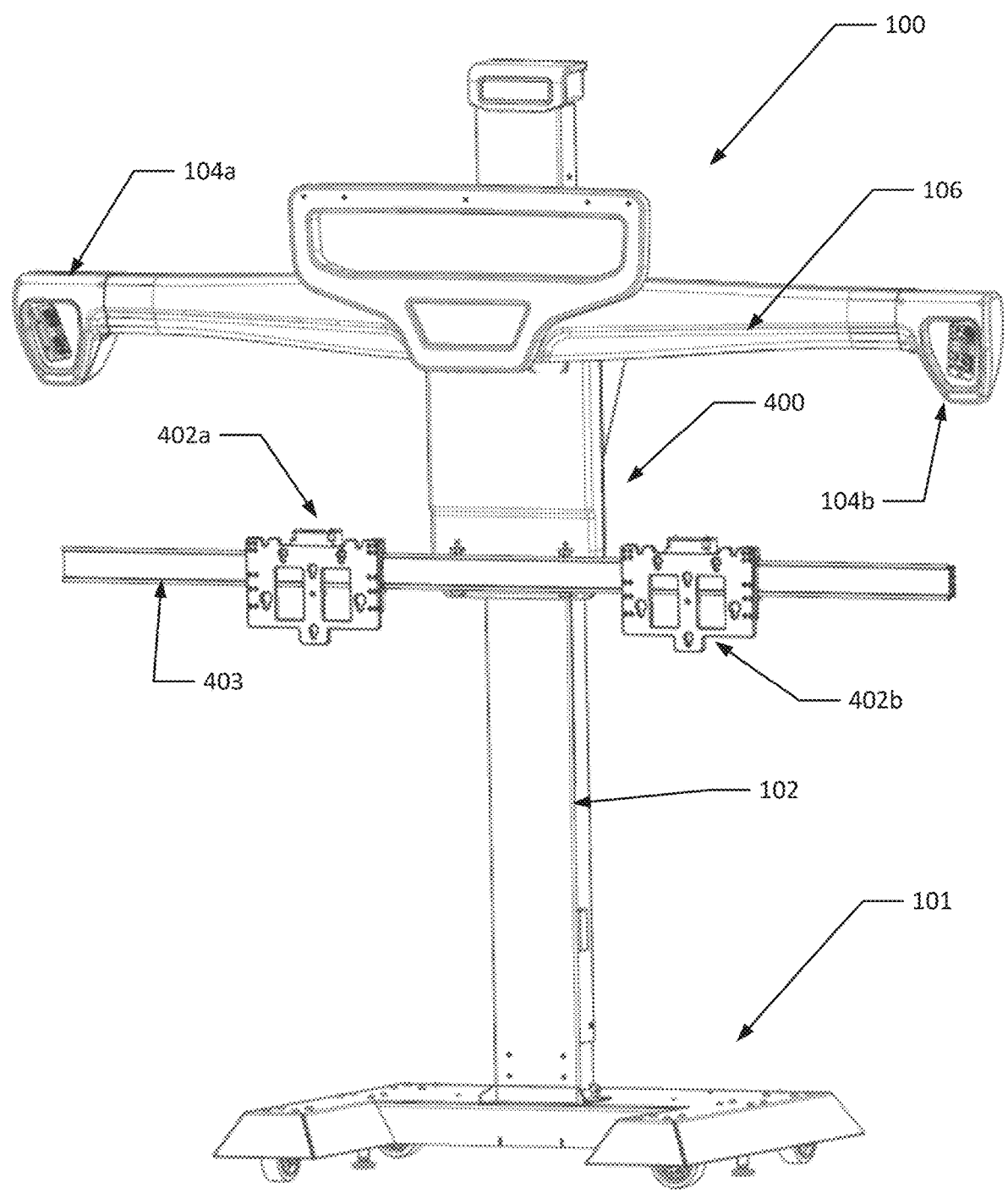
FIG. 4 is a perspective view of the vehicle service system illustrating a pair of target mounting fixtures disposed on the horizontal rail.
Figure 5:
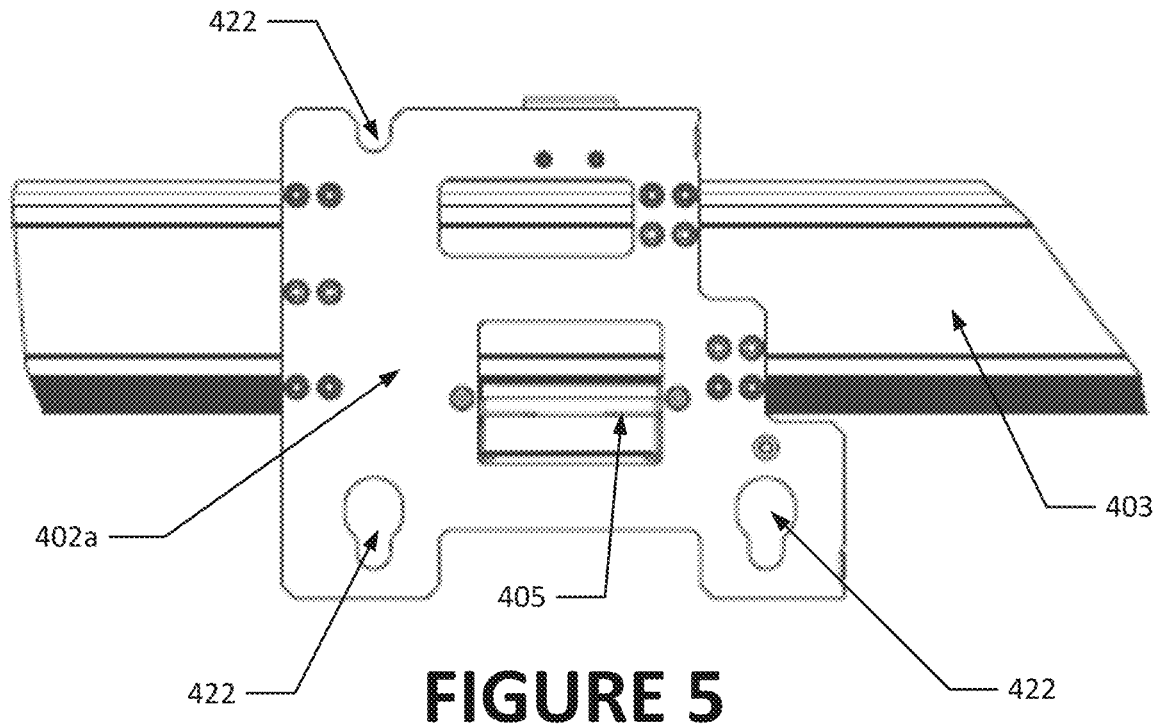
FIG. 5 is a close perspective view of a first target mounting fixture from FIG. 4.
Figure 6:
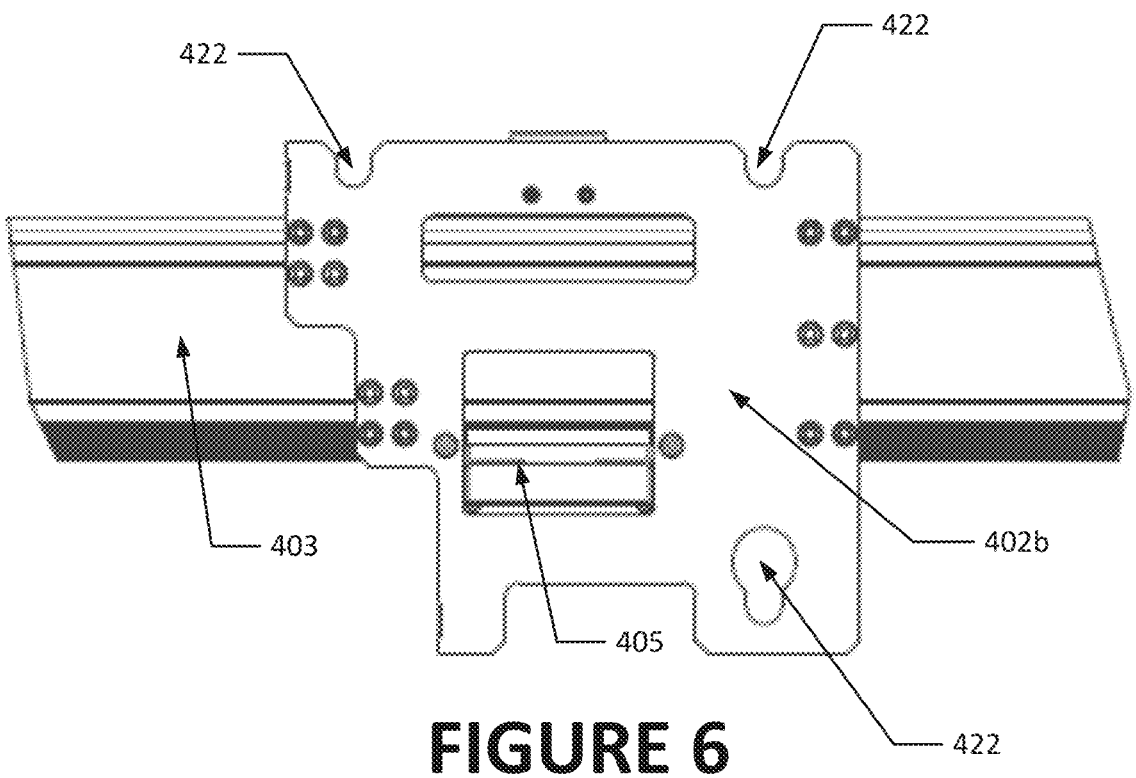
FIG. 6 is a close perspective view of a second target mounting fixture from FIG. 4.

Turning to FIGS. 1-2, a vehicle service system 100 consists of a movable or fixed base 101, a vertical column or upright 102 coupled to the base 101, and a set of laterally spaced camera modules 104a, 104b carried by the vertical column 102 and used for optical measurement of a vehicle. To laterally space the camera modules 104a, 104b for viewing opposite lateral sides of the vehicle, a camera crossbeam 106 is carried by the vertical column 102, with the camera modules 104a, 104b located adjacent opposite longitudinal ends. Each camera module contains one or more cameras at 105 with fields of view oriented in a generally forward direction as required to view each lateral side of the vehicle undergoing service. The camera crossbeam 106 is optionally vertically (and/or rotationally) adjustable relative to the vertical column 102.

It will be recognized that while the vehicle service system 100 illustrated in FIGS. 1-2 and described above, utilizes a vertical column or upright 102 and a camera crossbeam 106, other configurations may be utilized without departing from the scope of the present invention. For example, in place of the vertical column 102 and camera crossbeam 106, a vehicle service system 100 may consist of a pair of articulated camera support arms to position individual cameras in laterally spaced arrangements as required to achieve the fields of view necessary to observe features or targets associated with a vehicle undergoing a wheel alignment service, measurement, or inspection.

The camera modules 104a, 104b are operatively coupled to a processing system (not shown), which may be disposed in a housing carried on the vertical column 102 or in associated console (not shown) in proximity to vehicle service system 100. The processing system is configured with suitable logic circuit components and with software instructions for receiving image data from the camera modules 104a, 104b, evaluating the image data to identify relative spatial positions of observed surfaces, such as optical targets disposed on the wheels or surfaces of a vehicle, and for computing associated vehicle characteristics, such as vehicle alignment angles (i.e., thrust line) or vehicle body position (i.e., center line). It will be understood that the configuration of the processing system, camera modules 104a, 104b, and console are generally known in the art of machine vision vehicle wheel alignment systems, and may vary from the specific configuration described herein without departing from the scope of the invention, so long as the processing system is capable of determining at least a spatial position or orientation of surfaces associated with the vehicle relative to the camera modules 104a, 104b, or the vehicle service system 100, in a spatial frame of reference.

To facilitate alignment and calibration of safety system sensors onboard a vehicle, such as radar, LIDAR or optical sensors, one embodiment of the vehicle service system 100 includes at least one target support structure 400 coupled to the vertical column 102 or to the camera crossbeam 106 for supporting a removable target 500. The target support structure 400 provides a mounting fixture 402, shown in FIG. 2 configured for lateral movement along a horizontal rail 403. A variety of target backing frames or plates 401 of varying sizes and/or configurations may be removably coupled to the mounting fixture 402 to support associated removable targets 500 for servicing a variety of vehicle makes and models.

Figure 7:
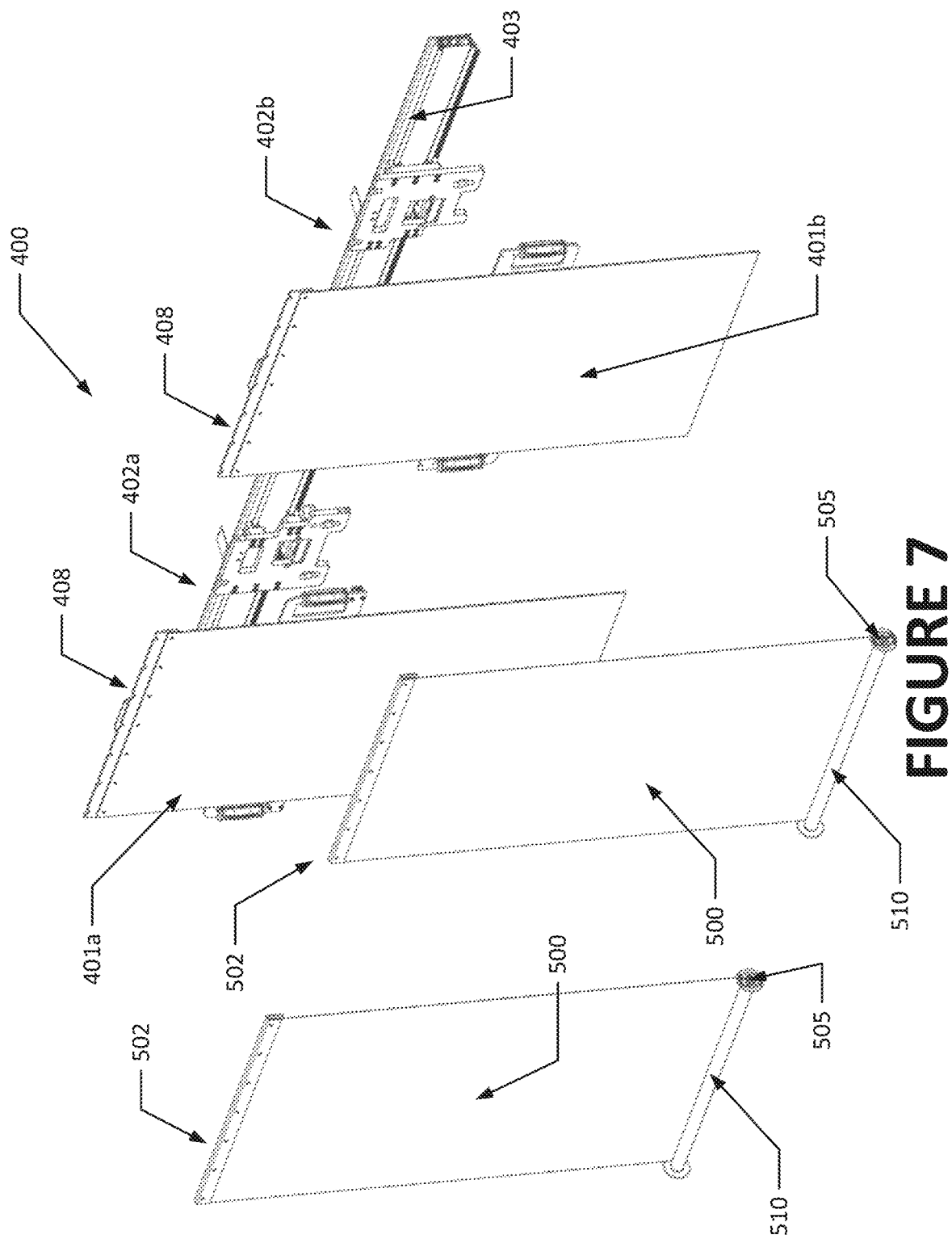
FIG. 7 is a exploded perspective view of a pair of targets and target backing frames or plates for coupling to the pair of target mounting fixtures shown on the horizontal rail of FIG. 4.
Figure 8:
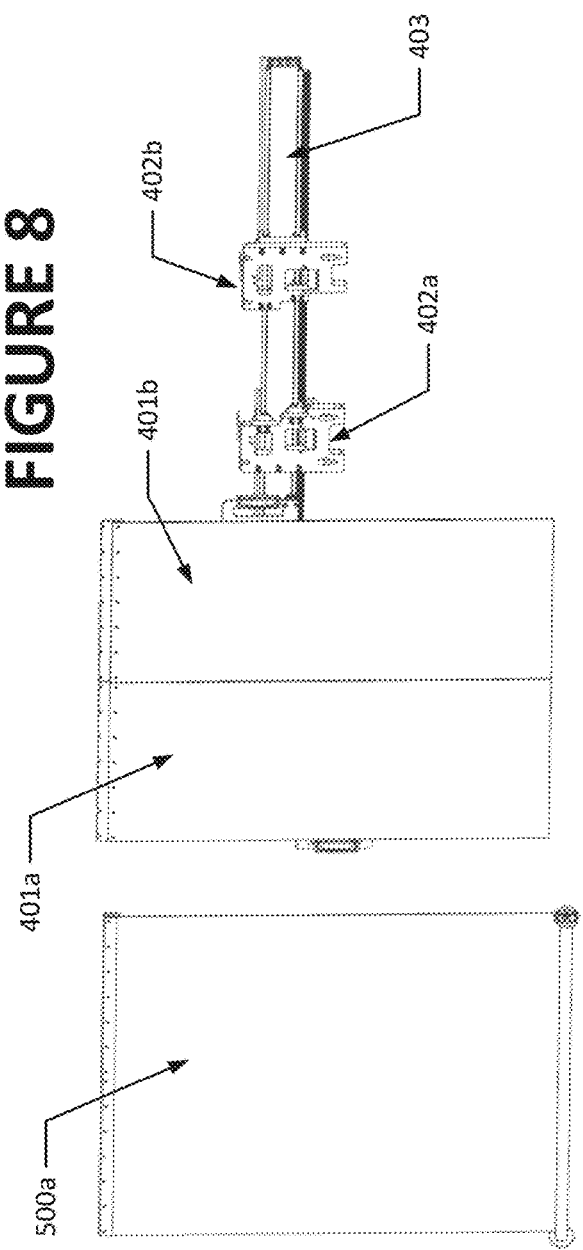
FIG. 8 shows an exploded front perspective view illustrating the relative position of the target mounting fixtures of FIGS. 5 and 6 for receiving a pair of abutting target backing frames or plates carrying an oversize ADAS calibration target.
Figure 9:
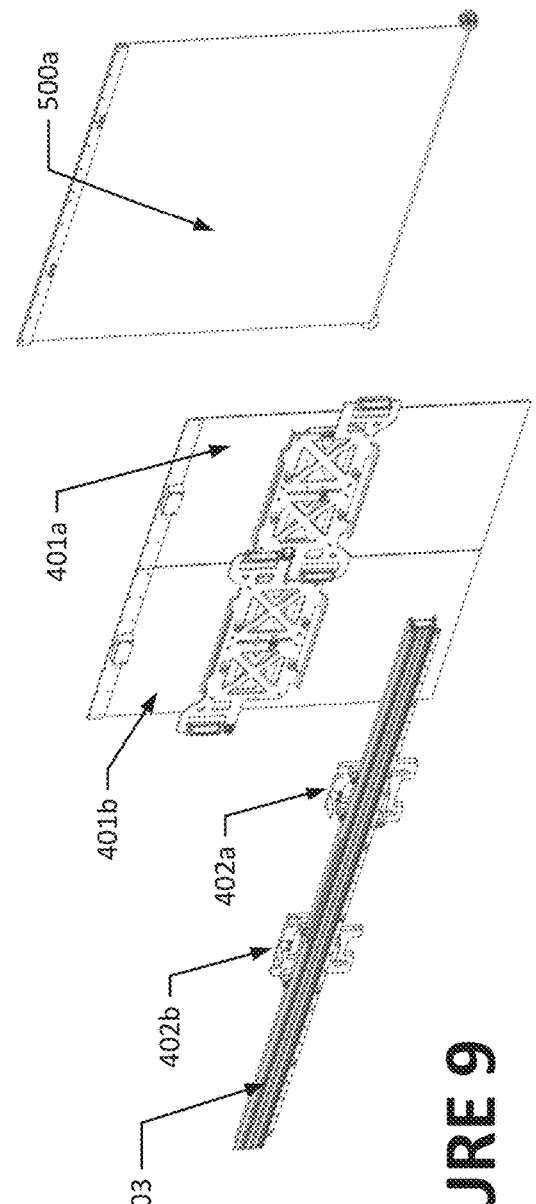
FIG. 9 shows an exploded rear perspective view of FIG. 8.
Figure 10:
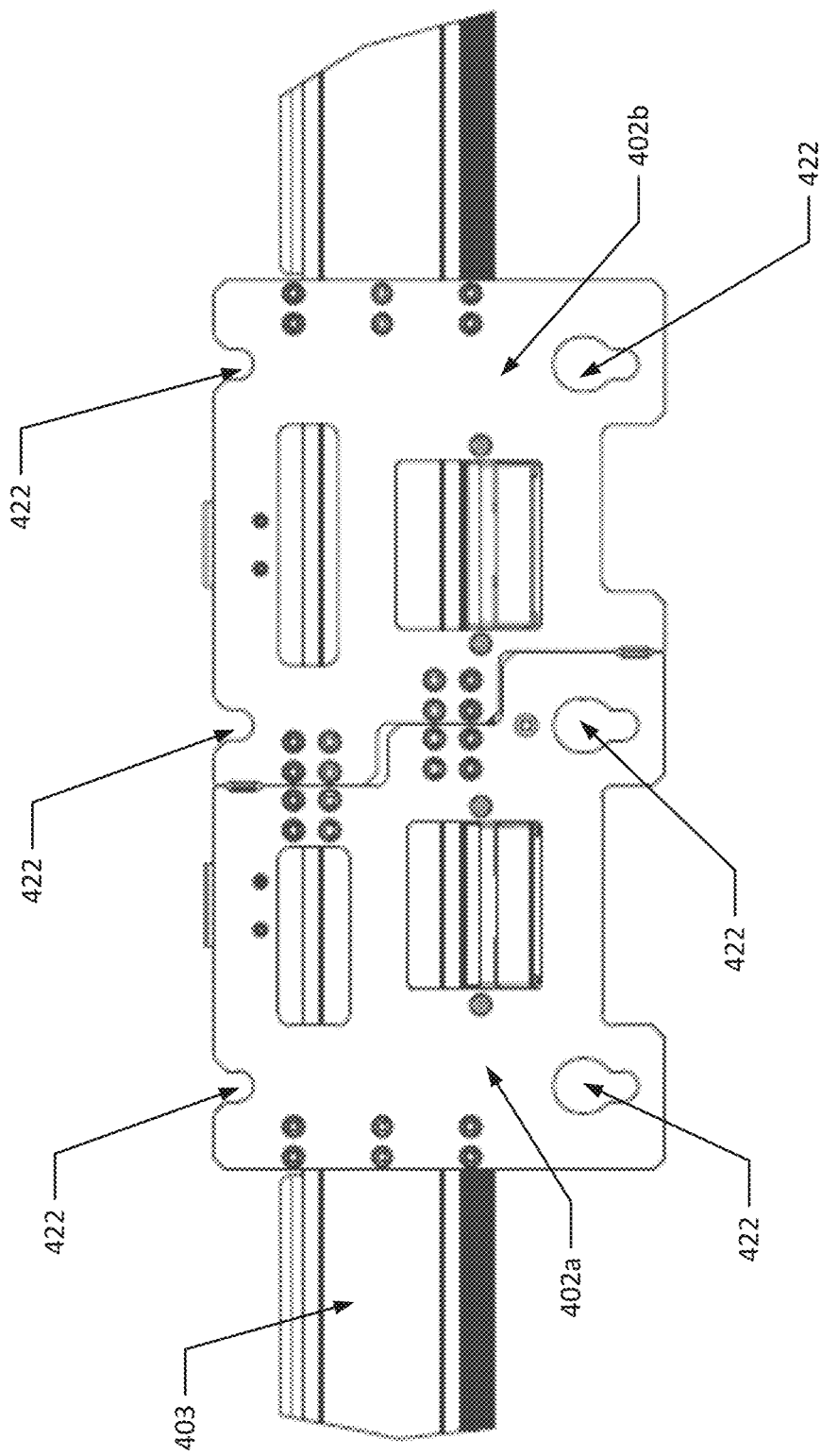
FIG. 10 is a close perspective view of the target mounting fixtures of FIGS. 5 and 6 disposed in abutting proximity on the horizontal rail.
Figure 11:
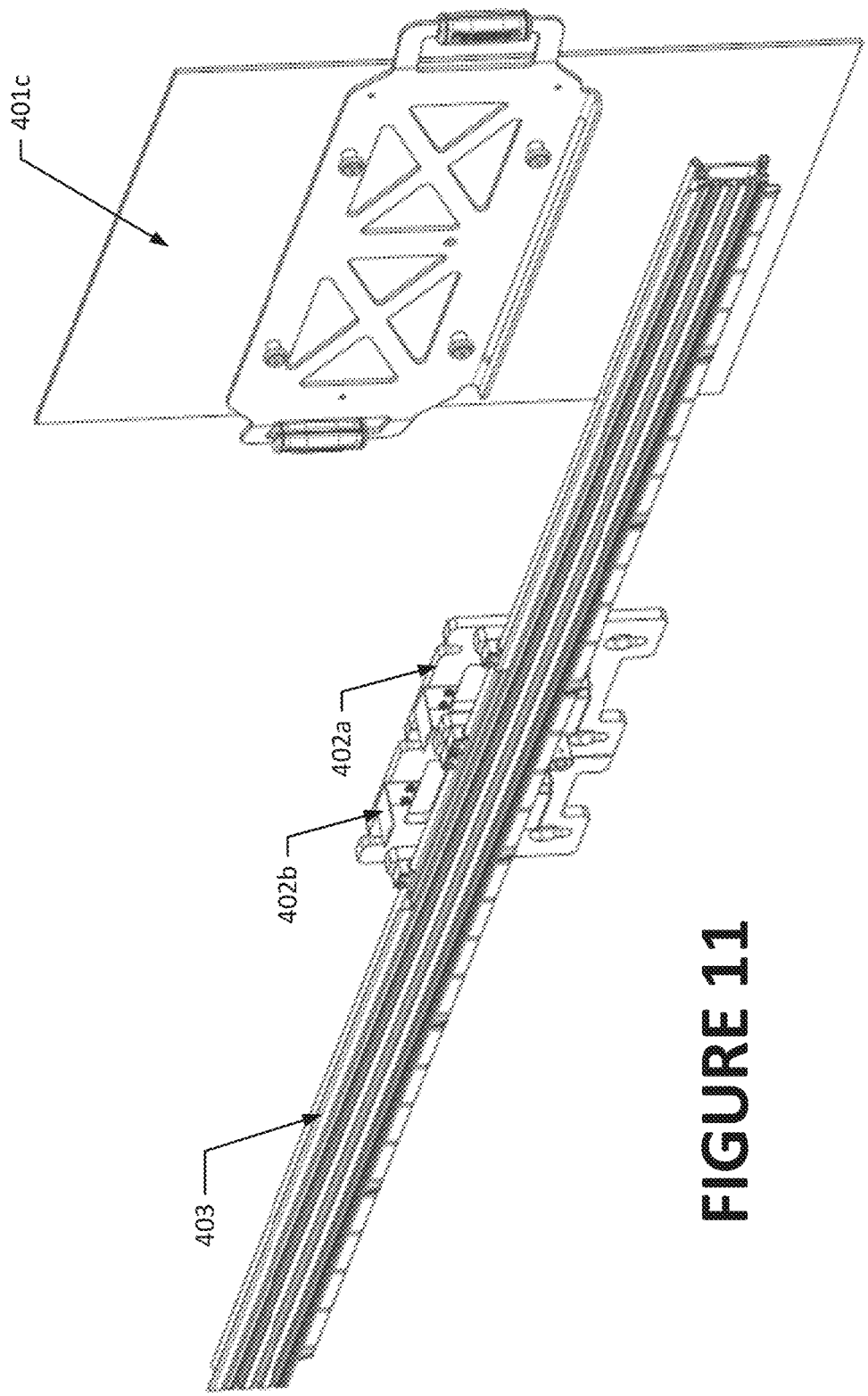
FIG. 11 shows an exploded rear perspective view illustrating the abutting position of the target mounting fixtures of FIGS. 5 and 6 for receiving a single oversize target backing frame or plate.

In one configuration, as seen in FIGS. 4-9, a pair of mounting fixtures 402a and 402b are each configured for independent lateral movement along the horizontal rail 403. Each mounting fixture 402a and 402b is configured to independently secure an associated target backing frame or plate 401a, 401b, as seen in FIG. 7, or abutting target backing frames or plates as seen in FIG. 9. When adjacently positioned as shown in FIG. 10 the mounting fixtures 402a and 402b can cooperatively support a single oversize target backing frame or plate 401c as shown in FIG. 11, providing support for a single oversize target 500a.

Figure 12:
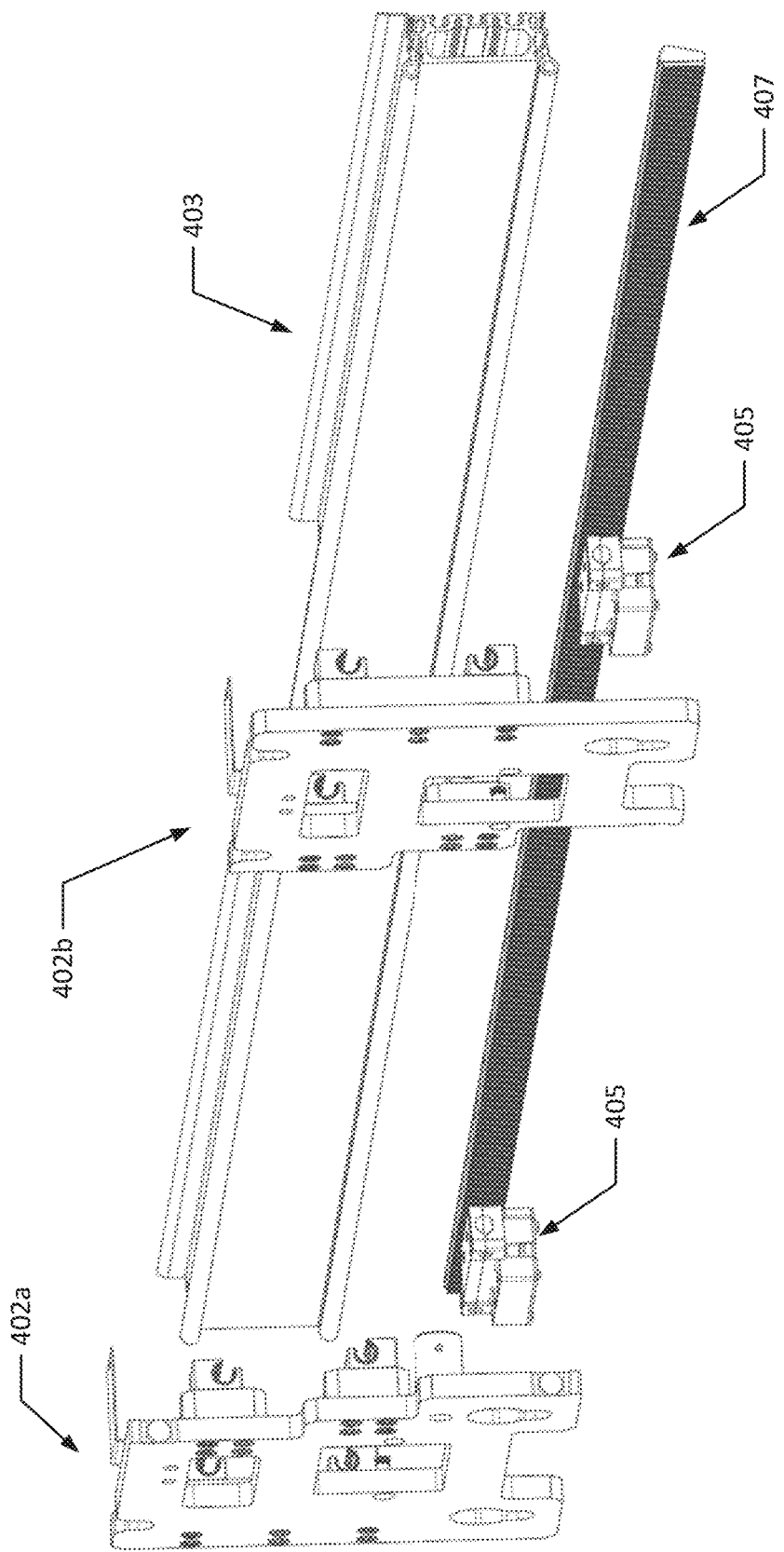
FIG. 12 shows an exploded perspective view of the pair of target mounting fixtures of FIGS. 5 and 6, the horizontal rail, and a pair of associated position sensors.
Figure 13:
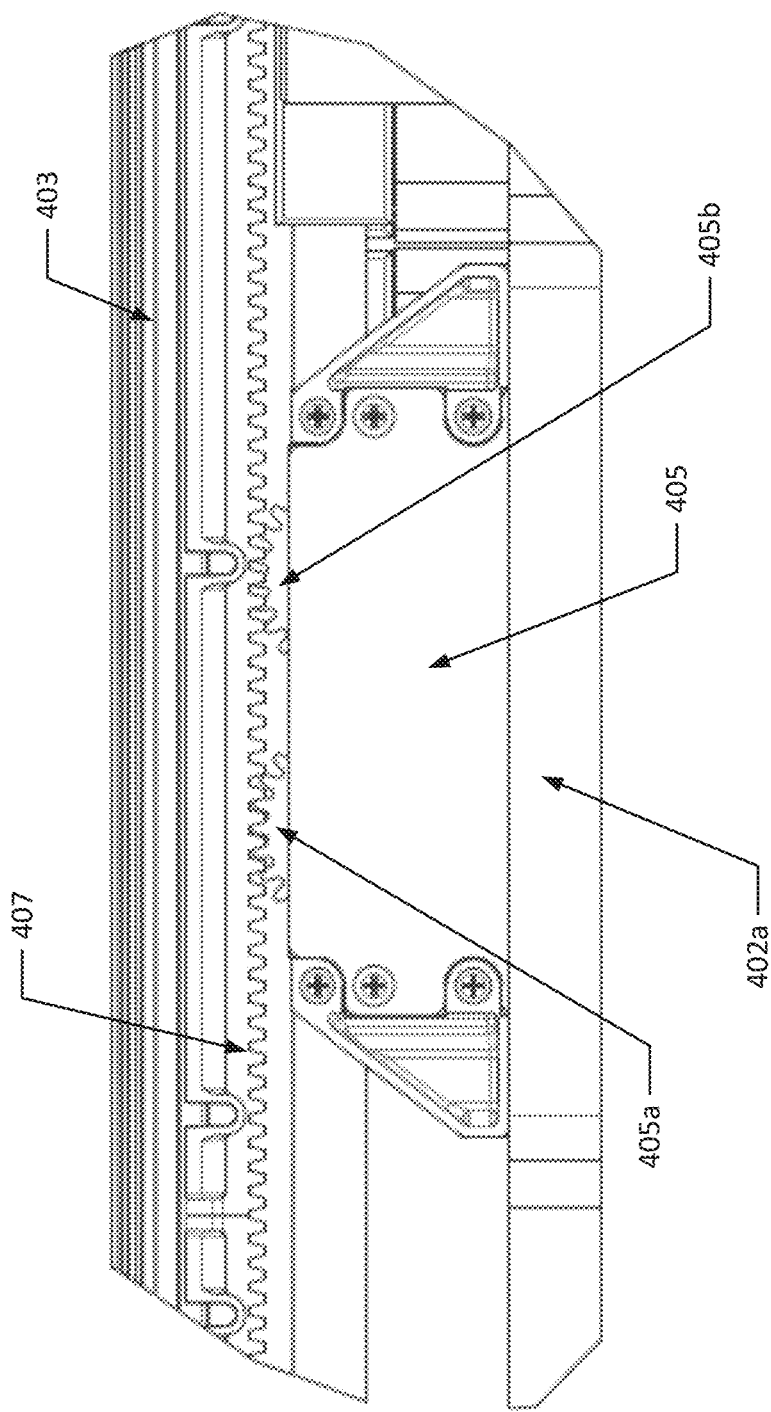
FIG. 13 is a bottom view of a target mounting fixture of FIG. 5 or 6 supported on the horizontal rail, illustrating engagement between an associated position sensor and a linear gear carried on the horizontal rail.

The processing system is preferably capable of tracking an absolute and/or relative position of each mounting fixture 402a, 402b on the horizontal rail 403 by monitoring an output of a rotatory positon encoder 405 associated with each mounting fixture, as shown in FIG. 12. Each rotary position encoder 405 includes one or more gears 405a, 405b, seen in FIG. 13, which are operatively engaged with a linear gear 407 disposed longitudinally along the horizontal rail 403. An output signal indicating the rotational position of the gears 405a, 405b within an associated rotary position encoder 405 represents a measure of linear distance over which the rotary position encoder 405 has traveled along the linear gear 407 from a starting position.

Each mounting fixture 402a, 402b includes a set of attachment point for receiving an associated target backing frame or plate 401. In an exemplary configuration, as shown in FIGS. 2 and 4-6, each mounting fixture 402a, 402b includes at least three notches 422 for receiving interlocking pins from a target backing frame or plate 401. The notches 422 may be positioned along an upper edge of the mounting fixtures 402a, 402b, or may be formed in the lower edge of openings passing through the mounting fixtures 402a, 402b, such as the keyhole openings. Preferably, an equal number of symmetrically positioned notches 422 are provided in each mounting fixture 402, facilitating the placement of a target backing frame or plate 401 on either mounting fixture 402a or 402b. When the mounting fixtures 402a, 402b are in abutting engagement, as shown in FIG. 8, the symmetrical positioning of the notches 422 extends across the pair of mounting fixtures 402a, 402b, facilitating the placement of a single target backing frame or plate 401c configured to engage both mounting fixtures simultaneously, such as shown in FIG. 11.

Figure 14:
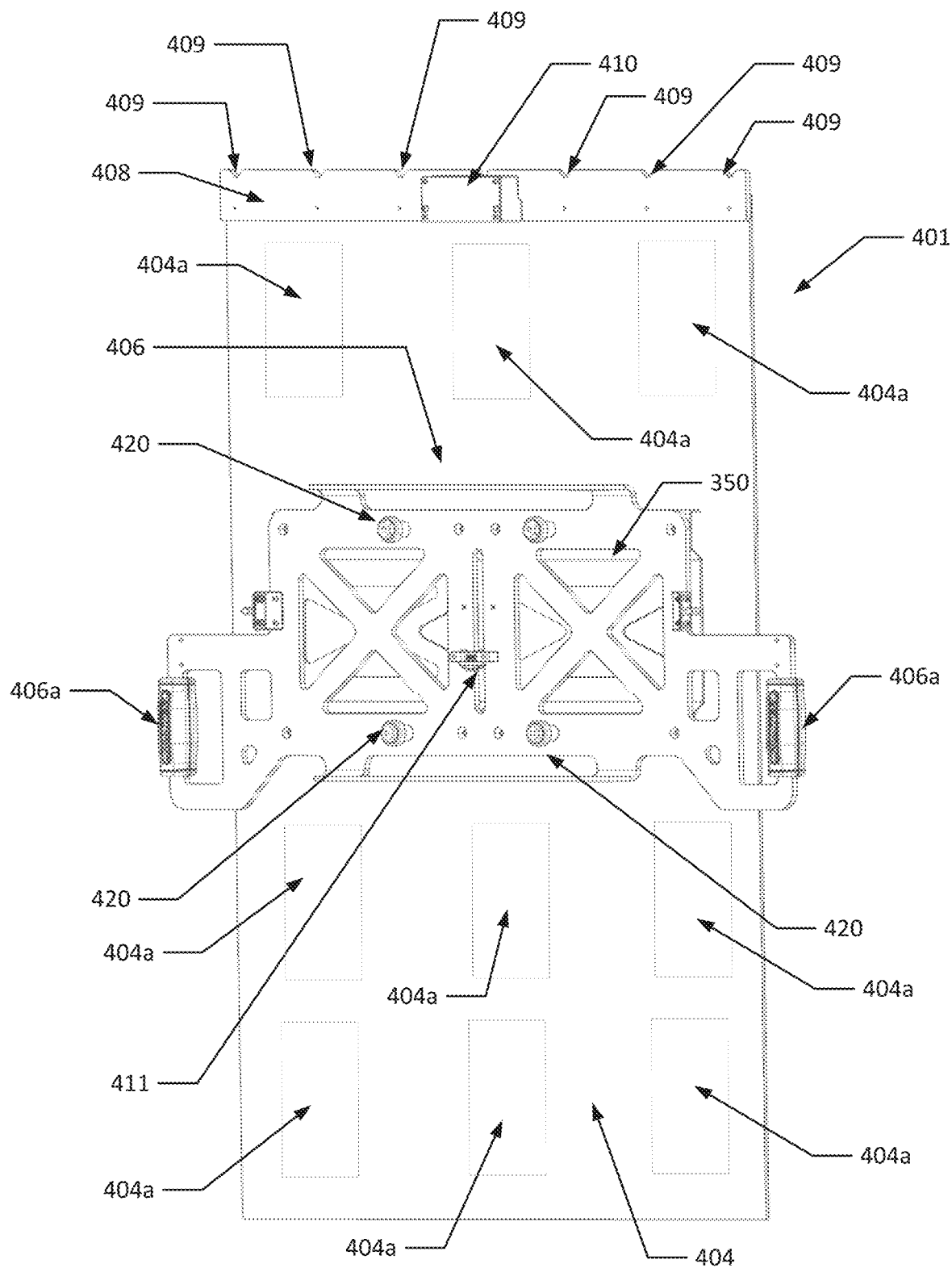
FIG. 14 is a rear perspective view of an exemplary target backing frame or plate incorporating weight-reducing cut out segments.

In one embodiment, each target backing frame or plate 401 consists of a rigid support surface 404, which may include optional cut-outs 404a to reduce weight and/or material, secured to a support frame 406. The rigid support surface 404 defines a planar surface to receive and/or support at least a portion of a removable target 500, while the support frame 406 provides handles 406a for ease of transport, and is configured for releasable engagement with the mounting fixture 402. For example, as seen in FIG. 14, the support frame 406 provides a set of spring-biased protruding pins 420 for engaging and seating within the notches 422 in a mounting fixture 402. Each protruding pin 420 extends perpendicular to the support frame 406, and is defined by a shaft portion and an end cap. The end cap diameter exceeds than the width of the notches 422, while the shaft portion diameter is sized to seat within the notch. A biasing spring is retained about the shaft portion by an underside lip portion of the end cap. A length of each shaft portion is selected to correspond to the thickness of the mounting fixture 402, such that when each pin is seated within a notch 422, the biasing spring is compressed between the underside lip portion of the end caps and a rear surface of the mounting fixture, limiting movement of the target backing frame or plate 401 relative to the mounting fixture 402.

An upper edge of the target backing frame or plate 401 includes a target guide element 408, to provide a fixed reference, such as a notches or recesses 409 for indexed alignment of a removable target 500 against the rigid support surface 404. Optionally, the rigid support surface 404 may be formed from a planar material having radar reflective properties for use during inspection or calibration of radar-based vehicle safety system sensors, and/or for adhesive properties to facilitate temporary attachment of the removable target 500. For example, the rigid support surface 404 may incorporate materials to aid in magnetic, mechanical, or electro-static adhesion of the removable target 500.

The mounting fixtures 402a and 402b secure the target backing frames or plates 401 to the horizontal rail 403 carried by the vertical column 102 or the camera crossbeam 106. Horizontal adjustments of the mounting fixtures 402a and 402b are enabled by sliding the mounting fixture 402 laterally along the horizontal rail 403, and tracking the absolute and relative horizontal positons thereof. Vertical adjustments and/or tilt adjustments (pitch, yaw, roll) are enabled by altering the position and/or orientation of the horizontal rail 403 relative to the vertical column 102, such as by rotating or tilting the camera crossbeam 106 from which the target support structure 400 is suspended. Optionally, the target support structure 400 may be configured with a multi-axis mechanism for precision adjustments to a horizontal position, vertical position, and/or pitch/yaw/roll orientations of the horizontal rail 403 and coupled mounting fixtures 402 over a limited range of movement relative to the vertical column 102 or camera crossbeam 106. Adjustments to the spatial position and pitch/yaw/roll orientation of the target backing frame or plate 401 may be required for safety system sensors which are offset from a vehicle centerline CL or thrust line TL after the vehicle service system 100 is (1) disposed generally in front of the vehicle; (2) any height adjustments to the camera crossbeam 106 are made to accommodate vehicle elevation; and (3) measurements of the vehicle's position relative to the vehicle service system 100 are acquired.

To enable the vehicle service system 100 to be utilized during the inspection or calibration of a wide range of vehicle ADAS systems, various removable targets 500 are associated with different vehicle make/model/year configurations undergoing inspection or calibration. In one embodiment, the removable targets 500 are formed on a flexible substrate 501 adapted to be temporarily secured against the forward face of the rigid support surface 404. The flexible substrate 501 may be a single layer of material, or may be a laminate composed of multiple layers of material, such as a backing layer, a printed layer, and a protective layer. In another embodiment, the removable target 500 is formed from a rigid, planar radar-reflective material.

Figure 15:
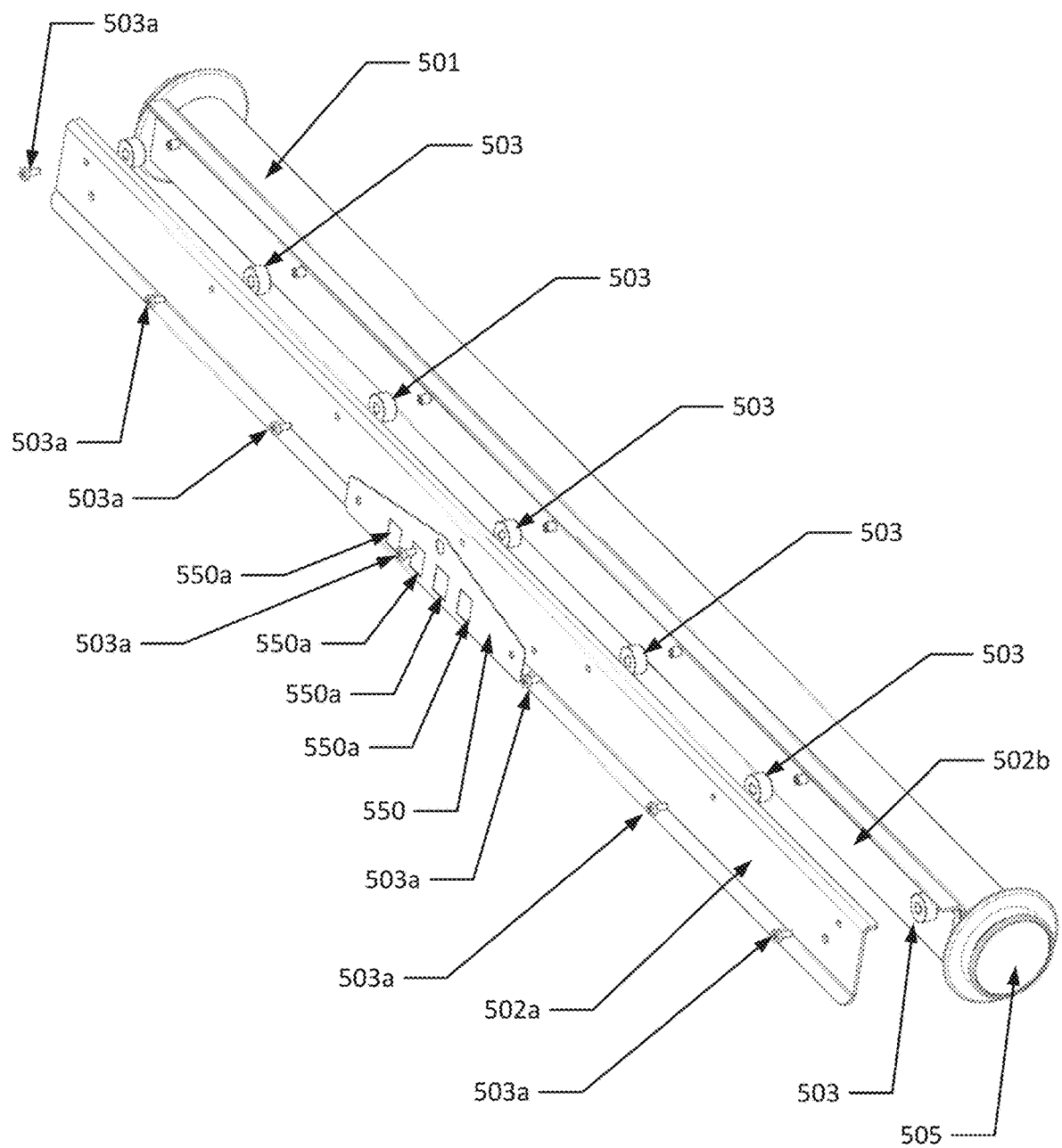
FIG. 15 is a perspective view of a channel edge for an ADAS calibration target configured to engage a target support structure.
Figure 16:
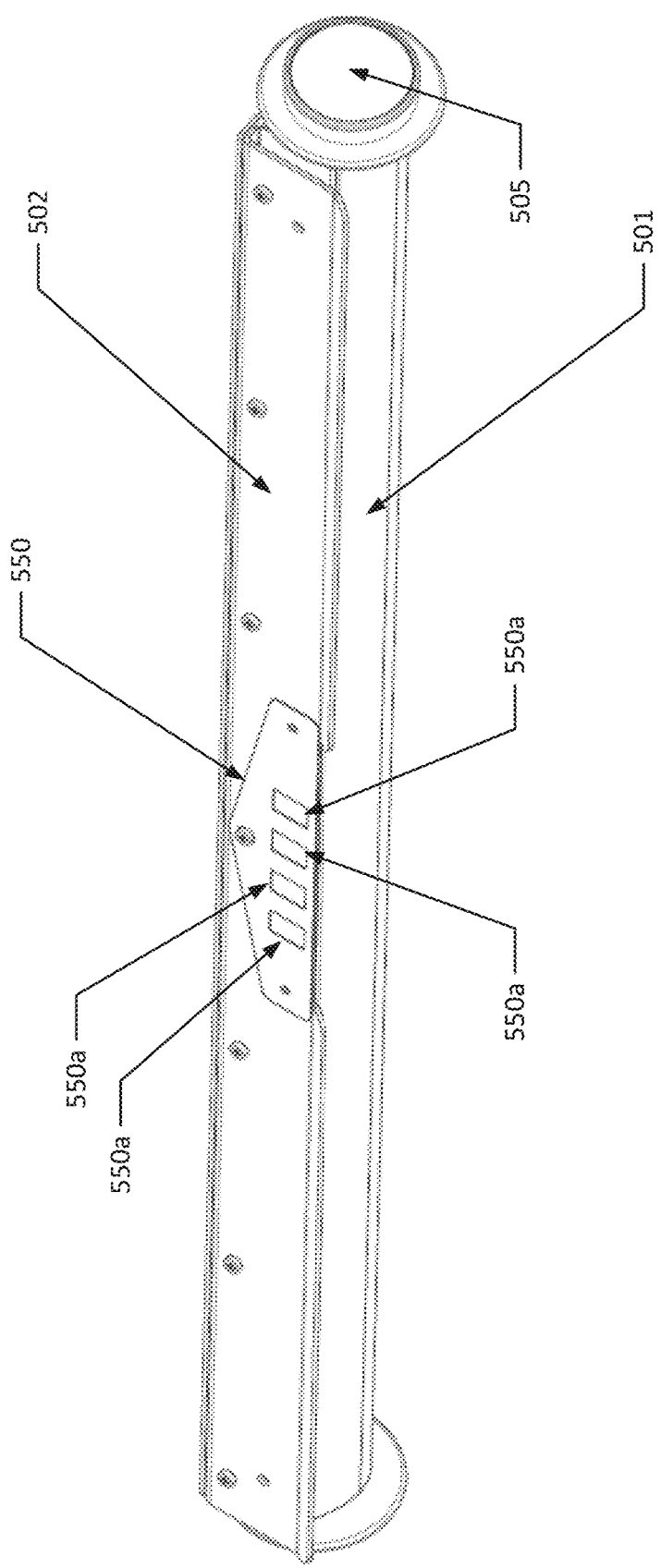
FIG. 16 is a rear perspective view of a rolled ADAS calibration target illustrating exemplary target identification elements on the channel edge.

To facilitate placement, each removable target 500 includes at least one edge 502 configured to index to, and engage with, the target guide element 408 adjacent an upper edge of the rigid support surface 404. In one embodiment, as shown in FIGS. 15 and 16, the edge 502 is formed from a pair of rigid channel members 502a, 502b which are secured together and to the flexible substrate 501 or rigid radar-reflective material. A set of dowels 503 secured by threaded screws 503a between members 502a and 502b define the interior spacing of the edge 502. The dowels 503 engage with notches 409 when the edge 502 is seated over the target guide element 408, indexing the removable target 500 in a predetermined position and/or orientation against the rigid support surface 404.

In a further embodiment, a bottom edge 510 of the removable target 500, opposite the edge 502, is weighted, such as by attachment of a cylindrical rolling element 505 to assist in maintaining the flexible substrate 501 in uniform contact with the forward face of the rigid support surface 404. The weighted bottom edge 510 optionally functions as a starting edge around which the flexible substrate 501 can be rolled for compact storage of the removable target 500, while leaving the edge 502 exposed to facilitate quick placement against the target guide element 408.

In various configurations, the flexible substrate 501 of the removable target 500 may be secured to the forward face of the rigid support surface 404 by magnetic adhesion, hook and loop fasteners, or electrostatic adhesion once the edge 502 is seated on the target guide element 408. For example, magnetic adhesion may be by provided by incorporating a magnetic material within the flexible construction 501, and providing one or more suitable magnetically attractive regions on the forward face of the rigid support surface 404. Either as an alternative, or in conjunction with the use of the flexible magnetic material, one or more individual magnets may be incorporated into flexible construction 501 and positioned to magnetically engage with corresponding magnets or magnetic surfaces disposed either in rigid support surface 404, or the target guide element 408, thereby securing the removable target 500 in against the rigid support surface 404.

It will be recognized that while the target edge 502 configured for indexed engagement with the target guide element 408 is described above as a top edge of the removable target 500, any edge, and/or multiple edges, of the removable target 500 may be provided with indexing features to engage with correspondingly aligned target guide elements 408 associated with the rigid support surface 404 without departing from the scope of the present invention.

With different vehicles requiring the use of different removable targets 500 during the vehicle ADAS system inspection or calibration procedures, a process is required to ensure that the correct removable target 500 is placed on the rigid support surface 404. In one embodiment, the processing system is configured with software instructions to identify, to a vehicle service technician, the specific removable target 500 required to complete a vehicle ADAS system inspection or calibration procedure, based on previously provided or acquired vehicle identifying data. The vehicle service technician retrieves the identified removable target 500 from a storage location, and positions it on the rigid support surface 404. The processing system is configured to subsequently complete the vehicle ADAS system inspection or calibration procedure under the assumption that the vehicle service technician retrieved and positioned the correct removable target 500.

In a further embodiment of the present disclosure, individual removable targets 500 are provided with identifying indicia or features such as optical patterns, mechanical elements, magnetic elements, metal elements for inductive sensing, or electronic circuits which can be evaluated by suitable sensors operatively coupled to the processing system, enabling the processing system to verify the operator has selected or retrieved the correct removable target 500 for placement on the rigid support surface 404.

For example, in an exemplary embodiment shown in FIG. 16, one face of the edge 502 on each removable target 500 is encoded with an optical target identifier 550 capable of being decoded by the processing system 300 when the removable target 500 is mounted to the rigid support surface 404. The optical target identifier 550 shown in FIG. 16 identifies the removable target 500 by an arrangement of optical windows or openings 550a through one face of the edge 502. Placing the removable target 500 on the rigid support surface 404 by seating the edge 502 onto the guide element 408 positions the optical target identifier 550 in proximity to an optical sensor 410 on the rigid support surface 404, operatively coupled to the processing system. The relative positioning of the optical windows or openings 550a selectively blocks or passes optical energy from the optical sensor 410. Individual targets provided with unique arrangements of the optical windows or openings 550a are identified by the processing system in response to the interaction between the optical windows or openings 550a and the optical sensor 410. In an further embodiment, the optical windows or openings 550a are replaced with surfaces having differing optical absorption, transmission, or reflective properties to encode a target identifier in a manner which can be read by an optical sensor.

In a further embodiment, such as for removable targets 500 defining rigid radar-reflecting surfaces, an electronic circuit such as a limit switch, is completed or closed on the rigid support surface when the removable target 500 is placed there on, providing an identification of the removable target as a radar-reflecting surface to the processing system.

Information identifying the installed removable target 500 is communicated to the processing system, which in turn is configured with appropriate software instructions to verify installation of the correct removable target 500 for the current vehicle service procedure. The processing system verifies the installation by matching the received target identifying information with a target identifier associated with either the specific vehicle or service procedure. If a mismatch is identified, the processing system is configured to provide the operator with a suitable warning.

In addition to verifying correct target selection and installation, the processing system is configured with software instructions to guide the operator to position the installed target 500 and associated mounting fixture 402a, 402b to a required position along the horizontal rail 403, and at any required orientation (pitch, yaw, roll) within the movement range of the target support structure 400. Initially, measurements of the vehicle undergoing service determined by the processing system from images of the vehicle acquired by the camera modules 104a, 104b are utilized to identify a positional relation between the vehicle and the vehicle service system 100. Vehicle manufacturer service and/or calibration requirements for the vehicle are recalled from an accessible data storage to identify required relative placement positions for each installed target 500. Using the output of the rotatory positon encoder 405 carried on the mounting fixture 402a, 402b, the processing system identifies either the current absolute position of the individual mounting fixture relative to a reference point on the horizontal rail 403, and/or a current relative lateral displacement between a pair of mounting fixtures 402a, 402 on the horizontal rail. The operator is then guided, via a suitable means, such as a graphical user interface (GUI) or other visual display, to slide the installed target 500 to the required position on the horizontal rail 403. In an exemplary configuration, the operator is presented with a graphical display indicating at least a required direction of movement for the installed target 500. As the operator slides the installed target towards the required position, a representation of proximity to the required position is displayed, enabling the operator to stop movement when the required position is reached. The representation of proximity can take the form of a numerical display, or a graphical display such as a moving arrow, bar graph, and/or changing color pattern representing the current and required positions for the installed target 500 on the horizontal rail 403.

The present disclosure can be embodied in-part in the form of computer-implemented processes and apparatuses for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A vehicle ADAS calibration and service system, comprising:
   a support structure including a vertical column;
   a horizontal rail supported by said vertical column in a vertically adjustable configuration;
   a mounting fixture carried on said horizontal rail, said mounting fixture laterally movable along said horizontal rail;
   a target support structure secured to said mounting fixture, said target support structure including a target backing frame or plate defining a planar surface, and a target guide element disposed along one edge of the planar surface;
   at least one removable target temporarily secured against said planar surface of said target backing frame or plate, said at least one removable target including a target identifier, a target pattern presented on a flexible substrate, and at least one rigid edge configured for indexed engagement with said target guide element to align said removable target on said target backing frame or plate; and
   wherein said target support structure further includes a sensor to extract target identification data from said target identifier for communication to a processing system.

2. The vehicle ADAS calibration and service system of claim 1 wherein said processing system is configured to compare said extracted target identification data with an expected target identification to verify a selection of said at least one removable target.

3. The vehicle ADAS calibration and service system of claim 1 wherein said processing system is configured to present a visual display of said extracted target identification data to an operator to assist in verifying a selection of said at least one removable target.

4. The vehicle ADAS calibration and service system of claim 1 wherein said target identifier is a spaced arrangement of optical elements representative of said target identification data, said spaced arrangement of optical elements selectively passing, blocking, or reflecting a pattern of light to least one optical receiver element of said sensor when said at least one removable target is secured to said target support structure.

5. The vehicle ADAS calibration and service system of claim 4 wherein said optical elements are disposed on said rigid edge.

6. The vehicle ADAS calibration and service system of claim 1 wherein said at least one removable target is detachably secured to at least a portion of said planar surface of said target backing plate by magnetic adhesion.

7. The vehicle ADAS calibration and service system of claim 6 wherein said flexible substrate includes a magnetic material, and wherein said target backing plate includes at least a region of magnetic material.

8. The vehicle ADAS calibration and service system of claim 1 further including a second mounting fixture carried on said horizontal rail, said second mounting fixture laterally movable along said horizontal rail;
   a second target support structure secured to said second mounting fixture, said second target support structure including a second target backing frame or plate defining a second planar surface, and a second target guide element disposed along one edge of the second planar surface;
   a second removable target temporarily secured against said second planar surface of said second target backing frame or plate, said second removable target including a second target identifier, a second target pattern presented on a second flexible substrate, and a second rigid edge configured for indexed engagement with said second target guide element to align said second removable target on said second target backing frame or plate; and
   wherein said second target support structure further includes a second sensor to extract target identification data from said target identifier of said second removable target for communication to said processing system.

9. The vehicle ADAS calibration and service system of claim 8 wherein said first and second removable targets are disposed in a spaced apart arrangement along said horizontal rail to present discrete target surfaces towards a vehicle undergoing calibration or service.

10. The vehicle ADAS calibration and service system of claim 8 wherein said first and second removable targets are disposed in abutting engagement on said horizontal rail to present a unified target surface towards a vehicle undergoing calibration or service.

11. The vehicle ADAS calibration and service system of claim 1 further including a set of laterally spaced camera modules on a camera crossbeam carried by said vertical column, said camera modules each including at least one camera configured to acquire images associated with a vehicle undergoing calibration and/or service for communication to a processing system;

at least one position sensor associated with said mounting fixture, said position sensor generating an output signal representative of either an absolute or a relative lateral location of said mounting fixture on said rail;

a processing system is configured with software instructions to evaluate said acquired images to determine at least one measurement associated with said vehicle; and wherein said processing system is further configured with software instructions to evaluate said output signal from said position sensor to direct a change in said lateral position of said mounting fixture on said horizontal rail in response to said determined measurement associated with said vehicle.

12. The vehicle ADAS calibration and service system of claim 11 wherein further including a graphical user interface, said graphical user interface responsive to said processing system to display guidance directing an operator to change said lateral position of said mounting fixture on said horizontal rail.

13. The vehicle ADAS calibration and service system of claim 11 wherein said at least one measurement associated with said vehicle is a spatial orientation of a vehicle centerline or a vehicle thrust line relative to said service system.

14. A vehicle measurement and calibration system, comprising:

a vertical support column;

a camera crossbeam carried by said vertical column in a vertically adjustable configuration, said camera crossbeam supporting a pair of laterally spaced camera modules, each camera module including at least one camera configured to acquire images associated with a vehicle within a vehicle service area;

a processing system configured to receive said acquired images from each camera, and to evaluate said acquired images to determine at least a spatial relationship between said vehicle and said vehicle measurement system;

a mounting rail secured in a fixed relationship to said camera crossbeam;

a mounting fixture engaged with said mounting rail for lateral movement there along;

a target support structure removably carried by said mounting fixture, said target support structure defining an upright planar surface generally parallel to said camera crossbeam and said mounting rail;

a target constructed with a flexible substrate affixed to at least one rigid edge member, said target including a target identifier disposed on said at least one rigid edge;

wherein said at least one target is removable secured to said target support structure by said at least one rigid edge member in indexed engagement with a guide element of said target support structure, such that said flexible substrate is at least partially supported in a planar configuration by said upright planar surface to present an optical target pattern towards said vehicle service area; and wherein said target support structure includes a sensor in communication with said processing system, said sensor configured to extract target identification data from said target identifier when said rigid edge member is in indexed engagement with said guide element.

15. The vehicle measurement system of claim 14 further including a position sensor associated with said mounting fixture, said position sensor generating an output signal representative of either an absolute lateral location or a relative lateral location for said mounting fixture on said mounting rail;

wherein said processing system is configured with software instructions to direct a lateral movement of said mounting fixture on said mounting rail in response to said output signal and to said determined spatial relationship between said vehicle and said vehicle measurement system.

16. The vehicle measurement system of claim 14 wherein said processing system is configured to evaluate said acquired images to determine at least one characteristic of said vehicle, said characteristic being a wheel alignment angle measurement, a vehicle reference line, or a vehicle body orientation.

17. The vehicle measurement system of claim 16 further including a position sensor associated with said mounting fixture, said position sensor generating an output signal representative of either an absolute lateral location or a relative lateral location for said mounting fixture on said mounting rail;

wherein said processing system is configured with software instructions to direct a lateral movement of said mounting fixture on said mounting rail in response to said output signal and to said determined characteristic of said vehicle.

18. A vehicle measurement system, comprising:

a vertical support column;

a camera crossbeam carried by said vertical column in a vertically adjustable configuration, said camera crossbeam supporting a pair of laterally spaced camera modules, each camera module including at least one camera configured to acquire images associated with a vehicle within a vehicle service area;

a processing system configured to receive said acquired images from each camera, and to evaluate said acquired images to determine at least a spatial relationship between said vehicle and said vehicle measurement system;

a mounting rail secured in a fixed relationship to said camera crossbeam;

a mounting fixture engaged with said mounting rail for lateral movement there along;

a position sensor associated with said mounting fixture, said position sensor generating an output signal representative of either an absolute lateral location or a relative lateral location for said mounting fixture on said mounting rail;

a radar reflective target panel removably carried by said mounting fixture, said radar reflective target panel including a target identifier and defining an upright planar surface generally parallel to said camera crossbeam and said mounting rail wherein said mounting fixture is configured to generate an identifying signal in response to the presence of said target identifier when said radar reflective target panel is positioned on said mounting fixture; and wherein said processing system is configured with software instructions to direct at least a lateral movement of said mounting fixture on said mounting rail to position said radar reflective target panel in response to said identifying signal, said location output signal, and to said determined spatial relationship between said vehicle and said vehicle measurement system.

19. The vehicle measurement system of claim 18 wherein said determined spatial relationship is associated with a vehicle thrust line orientation or a vehicle body centerline orientation.

\* \* \* \* \*